UNITED STATES PATENT OFFICE.

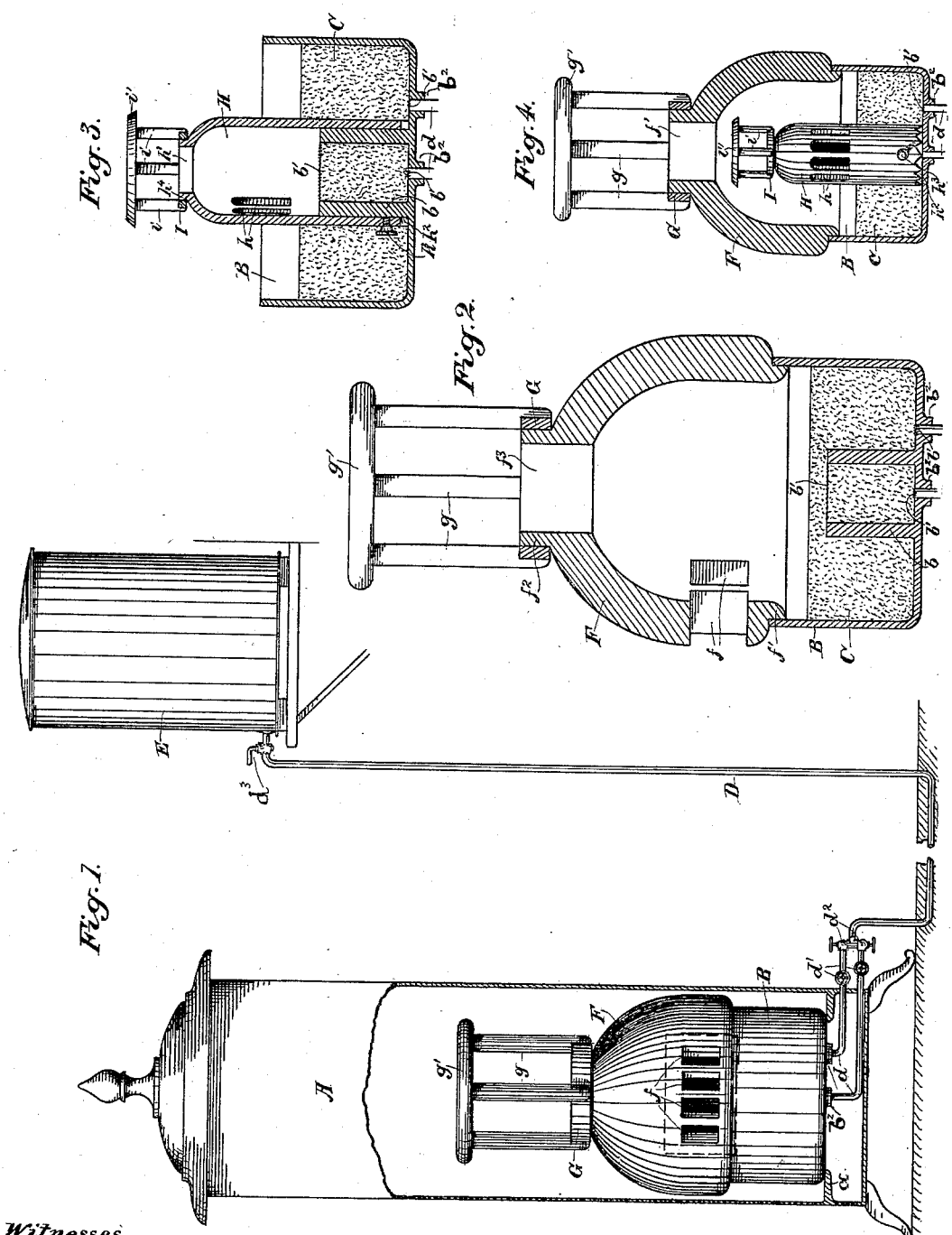

JOHN N. YOUNG, OF ALAMEDA, CALIFORNIA.

HEATING APPARATUS.

SPECIFICATION forming part of Letters Patent No. 701,241, dated May 27, 1902.

Application filed March 12, 1902. Serial No. 97,917. (No model.)

*To all whom it may concern:*

Be it known that I, JOHN N. YOUNG, a citizen of the United States, residing at No. 2128 Alameda avenue, Alameda city, county of Alameda, State of California, (having my post-office and business address at No. 723 Market street, room 21, "Bancroft-History" Building, San Francisco, California,) have invented a new and useful improvement in heating apparatus to be used in heating-stoves, ranges, grates, ovens, furnaces, fire-boxes, and for any and all other heating purposes where fuel is to be used, of which the following is a specification, reference being had to the accompanying drawings and to the letters of reference marked thereon.

My invention relates to a heating apparatus for stoves, ranges, grates, ovens, furnaces, fire-boxes, and for any and all other heating apparatus where fuel is used, including the use of coal-oil, crude oil, and petroleum, and any and all other inflammable liquids and fluids and for the purpose of avoiding all expensive apparatus usually employed in the use of the same.

The principal features of my invention are a tank or tanks or other receptacle for the storage of the fuel to be used, connecting pipe or pipes, the stove or other object to be heated, also a pan or other receptacle deposited in a place suitable to communicate the heat to the object or objects to be heated. In this pan or other receptacle I put certain incombustible substances of a porous nature, such as asbestos or other indestructible porous substances or substance or substances of such relationship as to form interstices—such as sand, gravel, or other similar substances, or both. Over these substances, within the tube inside of the pan or receptacle hereinafter described and covering the openings through which the fuel flows into the said pipe and the receptacle, I place wire-net covers. When highly inflammable and explosive fuel is being used, a similar wire-net cover should also be placed over the top of the said substances in the pan or receptacle; otherwise it may be dispensed with. From the inside of the bottom of this pan or receptacle there is a tube about one half of the height of the pan or receptacle continuous with and forming a part of the pan or receptacle. This tube varies in diameter in proportion to the size of the pan or receptacle, its average diameter being about two inches. Over the top of the pan or other receptacle I place a closely-fitting raised cover, forming the upper part of my burner, for the purpose of causing a confined space for full combustion and for storage of heat, and over the top of this raised cover, several inches above it, I place a circular piece to prevent the heat from the burner from passing out of the heated place too readily. This may in some cases be dispensed with. I attain these objects by the mechanism illustrated in the accompanying drawings, forming a part thereof, in which—

Figure 1 is a view of a stove, part of which is broken away to show the burner in its position. Fig. 2 is a vertical section through the burner. Fig. 3 is a modified form of my burner shown in a vertical sectional view. Fig. 4 shows a modified burner in connection with my first-named burner.

Similar letters refer to similar parts throughout the several views.

In Fig. 1, A is a common heating-stove. $a$ is a support. This is usually the grate in the stove or the projections with which the grate is connected in any stove. B is the pan or receptacle of my burner or heating apparatus. $b$ is the tube formed in the bottom of the pan or receptacle. $b^2$ represents the nipples, through an opening in which the branch feed-pipes $d\ d$ pass to the inside of the bottoms of the tube $b$ and the pan or receptacle C. $b'\ b'\ b'$ are the screens, one at the top of the tube $b$, one at the bottom of the inside of the tube, and one at the bottom of the inside of the receptacle, and both covering the openings at the discharge ends of the pipes $d\ d$ at the top of the openings through the nipples $b^2$. C is the compound or incombustible substances within the pan B and within the tube $b$. D is the feed-pipe through which the fuel or combustible substance flows from the storage-tank to the place of combustion. $d$ represents the branch pipes through which the fuel or combustible substance flows into the pan B or tube $b$. $d'$ represents the faucets or valves to regulate the flow of the combustible substance flowing therein. $d^2$ represents the regulating-valves or set-valves which permanently regulate the greatest amount of fuel intended to be consumed at any one time. $d^3$ is a faucet or valve in the pipe D adjacent to the storage-tank E to regulate the supply of fuel into the pipe D or to cut off the supply altogether.

E is the tank or other storage-receptacle from which the combustible substance flows. The fuel in this tank or in these tanks when two or more are used flows from it or them to the stove or other place where it (the fuel) is to be consumed through the law of attraction, its own gravity being sufficient to raise it to the desired position by reason of the tank or tanks E being elevated above the level of the place where the fuel is to be consumed. F is the raised cover or upper part of my burner. $f$ represents apertures for the ingress of air. $f'$ is a girdle-flange forming a part of the raised cover F. $f^2$ is a flange around the exit-opening $f^3$ of the raised cover F. $f^3$ is the exit-opening in the top of the cover F, through which the flame passes out. G is a ring surrounding the flange $f^2$. $g$ represents the legs, and $g'$ is the circular piece or cap, forming, with the legs $g$ and the ring G, a continuous piece.

In Fig. 3 H is the cover of the modified form of my burner. This cover H may be made elliptical in form above the top of the tube $b$. $h$ represents apertures in the cover H of Fig. 3 to admit the air and to provide for draft. $h'$ is the exit-opening at the top of the cover H. $h^2$ is the serrated bottom of the cover H for the purpose of allowing the exit of any fuel which may pass down between the cover H and the tube $b$. $h^3$ is a set-screw passing through the cover H, with its inner end set against the external surface of the pipe $b$. This set-screw $h^3$ is provided so that the cover H may be raised and fastened at any point along the length of tube $b$, thus elevating the modified burner H, which is desirable when the modified form H is used without being inclosed in my burner BF proper. (Shown at Fig. 1.) $h^4$ is a perpendicular flange around the exit-opening $h'$. I is a band or ring around and fitting closely to flange $h^4$. $i$ represents the legs to the cap or circular piece $i'$, sustained above the exit-opening $h'$. This ring I, legs $i$, and the cap $i'$ form one solid or continuous piece and may be readily adjusted to the cover H and may be dispensed with when desirable.

The nipples $b^2$ and the branch pipes $d\ d$ are preferably located at the bottom of the pan B, so that the fuel may enter in at the bottom of the pan B, where it is readily absorbed by the contents or compound C, contained within the pan B and the tube $b$, and when the fuel rises to the upper surface of the tube $b$ and the pan B, or either thereof, it is then ready to be ignited by the proper application of fire. When fuels of different degrees of combustibility and which do not readily mix are to be used, they may be stored in two or more tanks E and commingled in a common pipe D near their discharge from the tanks E, or they may be conveyed in separate pipes D to separate entrances or into the same entrance into the burner BF or H through the nipple or nipples $b^2$, when the most combustible of such fuels may be first used to start the fire and create a heat in the burner BF or H, after which by reason of the already created heat in the burner BF or H the less combustible fuel may be admitted, and it will then readily burn without the addition of more combustible fuel, when it may be consumed by itself and alone, when the more combustible material may be shut off by the valves $d'$ or $d^2$, through which it flows, either or both.

The pan B and the raised cover F and, when used, the circular cap $g'$ or other receptacle are deposited in or at the object to be heated or at any place where it is desirable that heat shall be produced at its most convenient position to heat the object or objects to be heated or otherwise or where it is required to produce heat. It may be made to conform to the inner surface of a chamber or other place where it is located, leaving space for the inlet of air sufficient to supply the demands of combustion within the burner BF or H, or both. The pipe D may be one continuous pipe from the tank E to the inside, preferably of the bottom, of the pan B, and this even though the pan B has a tube $b$ within it. This tube $b$, when desired, may be entirely dispensed with, particularly when the burner BF is to be used without a modified burner H being contained within it. I prefer, however, to divide the pipe D into two branches $d\ d$ a short distance from the burner BF, so that by the proper use and adjustment of the faucets or valves $d'$ and $d^2$ the fuel may be allowed to flow into the tube $b$ and not into that portion of the pan B outside of the tube $b$. This may be especially desirable when the modified form of burner H is to be used. By the same means of adjustment the fuel may be allowed to flow only into the basin B by the aperture or entrance through the nipple $b^2$ outside of the tube $b$ or by the use of both of said branch pipes $d\ d$ the fuel may be allowed to flow into both the tube $b$ and the basin B, outside of the tube.

The faucets or valves $d^2$ are to be set so as to supply to either or both of the branch pipes $d\ d$ the maximum amount of fuel intended to be used in the burner BF or H at any one time. The faucets or valves $d'$ are to regulate the quantity of fuel to be consumed at any one time, or from time to time between the maximum and minimum quantity, or none at all, it being preferable that the supply of fuel should be fed or entirely stopped or regulated by the valves $d'\ d'$ without disturbing or changing the set-valves $d^2$. By this means any person familiar or unfamiliar with the use of the burner BF or H may use the burner with safety, notwithstanding a highly-inflammable fuel may be in use. This modified form H of cover may be closed at the bottom, having in the bottom an opening for the entrance of a pipe D, as hereinbefore described, when it may thus be used independent of and disconnected from the pan B.

The compound or incombustible substance or substances C in the pan B and in the tube b are used for the purpose of absorbing, distributing, and dispersing the fuel conveyed to it through the pipe or pipes D and the branch pipe or pipes d d or which may in any other way be conveyed or communicated to it.

It will be understood that I may make slight alterations in the construction of my burners or of any of their several parts without departing materially from the spirit of my invention.

Having thus described my invention, what I claim, and desire to secure by Letters Patent, is—

1. In combination a receptacle for the storage of fuel to be used, a stove or other object or objects to be heated, connecting pipe or pipes with valves, and a receptacle containing porous, incombustible substance or substances, a raised cover or upper part above and resting upon said receptacle with openings therein for the inlet of air, and having an exit-opening at its top, and a flange around the exit-opening, a raised cap or circular piece sustained by legs and held in position by a closely-fitting ring around the flange at the top of said raised cover, all in proper heating relation to the stove or other object or objects to be heated, and all substantially as described and set forth.

2. In combination a receptacle for the storage of fuel to be used, a stove or other object or objects to be heated, connecting pipe or pipes with valves, a receptacle, a tube open at its upper end forming and being a continuous piece with the bottom of the receptacle and surrounding an opening through which the fuel enters, and said tube and receptacle containing porous, incombustible subtance or substances, a wire-net cover placed over said substances at or near the top of said tube, a wire net covering the said opening into the bottom of said tube, and said receptacle having a second opening for the influx of fuel into said receptacle outside of said tube, a wire-net cover being placed over said last-mentioned opening, a raised cover or upper part above and resting upon said receptacle with openings therein for the inlet of air, and having an exit-opening at its top, and a flange around the exit-opening, a raised cap or circular piece sustained by legs and held in position by a closely-fitting ring around the flange at the top of said raised cover, all in proper heating relation to the stove or other object or objects to be heated, and all substantially as described and set forth.

3. In a burner, the combination of a receptacle for the storage of fuel to be used, a stove or other object or objects to be heated, connecting pipe or pipes with valves, a receptacle, a tube open at its upper end forming and being a continuous piece with the bottom of the receptacle and surrounding an opening through which the fuel enters, and said tube and receptacle containing porous, incombustible substance or substances, a wire-net cover placed over said substances at or near the top of said tube, a wire net covering the said opening into the bottom of said tube, and said receptacle having a second opening for the influx of fuel into said receptacle outside of said tube, a wire-net cover being placed over said last-mentioned opening, a raised cover or upper part surrounding said tube having openings for the inlet of air, an exit-opening at the top surrounded with a flange, its lower edges serrated and a set-screw near its lower end, all placed in proper heating relation to the stove or other object to be heated, substantially as described and for the uses and purposes set forth.

4. In a burner, the combination of a receptacle for the storage of fuel to be used, a stove or other object or objects to be heated, connecting pipe or pipes with valves, a receptacle, a tube open at its upper end forming and being a continuous piece with the bottom of the receptacle and surrounding an opening through which the fuel enters, and said tube and receptacle containing porous, incombustible substance or substances, a wire-net cover placed over said substances at or near the top of said tube, a wire net covering the said opening into the bottom of said tube, and said receptacle having a second opening for the influx of fuel into said receptacle outside of said tube, a wire-net cover being placed over said last-mentioned opening, a raised cover or upper part surrounding said tube having openings for the inlet of air, an exit-opening at the top surrounded with a flange, its lower edges serrated and a set-screw near its lower end, a raised cap or circular piece sustained by legs and held in position by a closely-fitting ring around the flange at the top of said raised cover, all placed in proper heating relation to the stove or other object to be heated, substantially as described and for the uses and purposes set forth.

5. In a burner, the combination of a receptacle for the storage of fuel to be used, a stove or other object or objects to be heated, connecting pipe or pipes with valves, the receptacle continuous with the raised cover or upper part for the inlet of air, and an exit-opening at its top with a flange surrounding said exit-opening, a raised cap or circular piece sustained by legs and held in position by a closely-fitting ring around the flange at the top of said raised cover or upper part, said receptacle having its lower end or bottom closed except an opening in the bottom for the influx of the fuel from the said connecting-pipe, all in proper heating relation to the stove or other object or objects to be heated, and all substantially as described and set forth.

JOHN N. YOUNG.

Witnesses:
A. J. HENRY,
MARION S. BLANCHARD.